United States Patent [19]

Scanzillo et al.

[11] Patent Number: 5,554,291
[45] Date of Patent: Sep. 10, 1996

[54] METHODS AND APPARATUS FOR BIODEGRADATION OF POLLUTED FLUIDS

[76] Inventors: Joseph G. Scanzillo, 15 Metacomett Rd., Scituate, Mass. 02066; Russell J. Anderson, III, 485 Mt. Blue St., Norwell, Mass. 02061

[21] Appl. No.: 300,719

[22] Filed: Sep. 2, 1994

Related U.S. Application Data

[63] Continuation-in-part of Ser. No. 965,734, Oct. 23, 1992, Pat. No. 5,344,557.

[51] Int. Cl.[6] ................................................. C02F 3/02
[52] U.S. Cl. .................... 210/615; 210/617; 210/747; 210/150; 210/170; 210/242.2
[58] Field of Search .......................... 210/150, 151, 210/120, 242.1, 242.2, 205, 220, 615, 617, 94, 602, 797; 435/262, 262.5, 264, 287, 288

[56] References Cited

U.S. PATENT DOCUMENTS

| | | | |
|---|---|---|---|
| 3,235,234 | 2/1963 | Beaudoin | 261/24 |
| 3,322,410 | 5/1967 | Ahlenius | 261/220 |
| 3,589,997 | 6/1971 | Grutsch | 210/219 |
| 3,664,647 | 5/1972 | Snow et al. | 261/30 |
| 3,720,317 | 3/1973 | Willinger | 210/94 |
| 3,768,200 | 10/1973 | Klock | 210/602 |
| 3,984,323 | 10/1976 | Evens | 210/220 |
| 4,072,612 | 2/1978 | Daniel | 210/169 |
| 4,086,306 | 4/1978 | Yoshinaga | 210/220 |
| 4,191,479 | 3/1980 | Shuck et al. | 366/101 |
| 4,303,528 | 12/1981 | Shibayama | 210/615 |
| 4,350,589 | 9/1982 | Stog | 210/242.2 |
| 4,446,236 | 3/1984 | Clyde | 210/150 |
| 4,482,510 | 11/1984 | Khudenko | 210/242.2 |
| 4,564,447 | 1/1986 | Tiedemann | 210/220 |
| 4,582,609 | 4/1986 | Hunter, III et al. | 210/170 |
| 4,600,694 | 7/1986 | Clyde | 210/151 |
| 4,670,149 | 6/1987 | Francis | 210/150 |
| 4,729,828 | 3/1988 | Miller | 210/150 |
| 4,810,385 | 3/1989 | Hater et al. | 210/150 |
| 4,990,449 | 2/1991 | Caissel | 210/617 |
| 4,995,980 | 2/1991 | Jaubert | 210/150 |
| 5,087,353 | 2/1992 | Todd et al. | 210/94 |
| 5,122,266 | 6/1992 | Kent | 210/150 |
| 5,202,027 | 4/1993 | Stuth | 210/151 |
| 5,228,988 | 7/1993 | DiClemente et al. | 210/150 |
| 5,294,340 | 3/1994 | Stog | 210/150 |

FOREIGN PATENT DOCUMENTS

| | | |
|---|---|---|
| 1377571 | 2/1965 | France . |
| 195735 | 1/1922 | United Kingdom . |

*Primary Examiner*—Christopher Upton
*Attorney, Agent, or Firm*—Wolf, Greenfield & Sacks, P.C.

[57] ABSTRACT

The present invention features methods and apparatus for biodegrading pollutants carried by aqueous fluid. The method and apparatus use a vessel and a matrix for immobilizing microorganisms and an inlet and outlet opening for creating a horizontal flow of fluid and air through the matrix. Microorganisms immobilized on the matrix biodegrade pollutants.

23 Claims, 5 Drawing Sheets

METHODS AND APPARATUS FOR BIODEGRADATION OF POLLUTED FLUIDS

This application is a Continuation-in-Part of U.S. patent application Ser. No. 07/965,734 filed Oct. 23, 1992 to Joseph G. Scanzillo entitled: Incubator for Biological Cleaning of Fluids, now U.S. Pat. No. 5,344,557.

BACKGROUND OF THE INVENTION

The present invention relates to methods and apparatus for biodegradation of pollutants in fluid bodies. Aeration of fluids will lead to the growth of microorganisms such as bacteria, fungi, and/or protozoa. These microorganisms act as "biocatalysts" to metabolize carbon based pollutants in an oxidative or aerobic process.

Aeration is generally carried out by injecting air under pressure into fluid to form bubbles or by allowing fluid to flow rapidly on and/or through surfaces or substrates to expose large surface areas of the fluids to air. Efficient and reliable aerating equipment is required to adequately aerate large volumes of fluids such as in a modern waste treatment plant. Current practice is to direct air into holding lagoons or tanks as bubbles so that they will pass upwards through the body of fluid and thereby oxidize any suspended organic matter.

This process is not entirely satisfactory since such aeration devices are often complex and rapidly become clogged due to suspended particulate material. Moreover, the mere presence of increased amounts of air will not always guarantee appropriate growth conditions for a particular type of microorganism. Nor does it assure that the microorganism will be present to utilize air flowing through a system. The time in which bubbles of air travel to the surface of a fluid body may be too brief to allow microorganisms to utilize the air resulting in inefficiencies.

Microorganisms obtain greater cell densities immobilized, as colonies, on solid surfaces. However, force which is created by the rapid discharge of bubbles from an air pump will often dislodge microorganisms attached to solid surfaces, thus defeating the intended purposes of the aeration.

SUMMARY OF THE INVENTION

The present invention is directed to methods and apparatus for treating polluted fluids. The methods and apparatus of the present invention feature an apparatus which acts as an incubator, promoting growth and metabolism of organisms. The organisms utilize pollutants in a body of polluted fluid for metabolic processes. The organisms remove the pollutants to effect a cleaning of the fluid.

One embodiment of the present apparatus comprises a containment vessel having a top and a bottom and at least one wall, the one or more walls defines a vessel exterior and an inner chamber and comprise at least one air impervious surface at the top of the vessel. The vessel has an inlet opening and an outlet opening. The inlet opening is adapted to receive polluted fluid from the vessel exterior and direct such fluid into the inner chamber. The outlet opening is adapted to receive fluid from the inner chamber and to direct such fluid to the vessel exterior. The inlet opening and outlet opening establish a flow of fluid within the inner chamber which flow is horizontal. The inner chamber of the vessel further comprises a matrix. The matrix has receiving surfaces for immobilizing organisms within the inner chamber, within the flow of fluid. The apparatus further comprises oxygen injection means for directing oxygen into the inner chamber to support the growth and metabolism of organisms within the inner chamber. The vessel further comprises orientation means for maintaining the vessel in a position where the flow of fluid within the inner chamber is horizontal and the top of the vessel has a position above the bottom. The air injected into the vessel is prevented from escaping by the air impervious surface.

As used herein, the term "horizontal flow" refers to the gross movement of fluid within the chamber. This gross movement may have a vertical component. However, this vertical flow is limited to the height of the apparatus and is associated with a larger horizontal component.

As used herein, the term "matrix" refers to a packing of individual pieces, such as raschig rings or other forms, or a fixed array of random, or regularly spaced and positioned solid surfaces.

The term "orientation means" refers to ballast and/or buoyancy chambers, pontoons, and the like, to float the vessel, or stilts or legs to stand the vessel in ponds or lagoons. Buoyancy chambers and pontoons are preferably used with anchoring devices to limit movement of the device.

The present device provides an enhanced environment for organism growth. The device preferably receives organisms from the environment in which it is placed. These organisms are acclimated to the pollutants and when provided sufficient oxygen will adhere to the solid surface of the matrix. These organisms typically comprise bacteria and algae. In some instances, such as spills from ocean going vessels, underwater pipes, the pollutant to be treated has been or can be readily identified. Due to the pollutants sudden introduction into the environment, no existing organism in the local environment is capable of efficiently degrading such pollutant. In such instances, the matrix may be seeded with a culture of organisms selected for its ability to degrade such pollutant.

Preferably, the apparatus supports algal growth by providing for photosynthesis. Photosynthesis generates oxygen and promotes the growth of nonphotosynthetic organisms. One preferred embodiment of the present invention features a vessel having at least one wall having an area which is light transmissive. The light transmissive area allows light into the chamber to promote photosynthesis by algae. Preferably, the light transmissive area is maintained in a position for receiving light by the orientation means of the device. Preferably, ballast and/or buoyancy means maintains a wall comprising a light transmissive area oriented above a wall comprising a bottom surface. The ballast and/or buoyancy means is preferably adjustable in the sense that the positive buoyancy may be changed to sustain the vessel at different depths of fluid. Ballast and/or buoyancy means preferably operate in conjunction with anchors, cables and other retaining devices to maintain the position of the vessel. With orientation means comprising legs or stilts, the vessel is positioned to receive light.

As used herein, the term "air injection means" refers to any apparatus or device for placing air into the vessel. By way of example, without limitation, devices for placing air in The vessel comprise air stones, venturi, air conduits and the like. A preferred air injection means comprise a venturi which functions as a fluid inlet opening and injects air into the vessel. The venturi and the outlet opening defines a horizontal flow of fluid within the chamber.

Preferably, the vessel is comprised of a plurality of modular units. The modular unit comprises a section of each wall defining the vessel exterior and inner chamber. The modular unit has a first interfitting surface and a second interfitting surface. The first interfitting surface of one modular unit is capable of receiving a second interfitting surface of a second modular unit.

Preferably, one or more modular units has a matrix. Preferably, the matrix is formed with the walls to provide a unitary structure or placed within the walls.

Preferably, one or more of the modular units has at least one wall with a light transmissive area. Preferably, the light transmissive area is at the top of the vessel upon assembly.

Preferably, in order to direct light into the inner chamber of the vessel, the one or more modular units having a light transmissive array, have an area which is devoid of the matrix to allow light to be transmitted into the inner chamber. In the alternative, a matrix may be used with void space cooperating with the light transmission areas.

Preferably, the modular units are constructed to allow the unit to be readily assembled or disassembled. Disassembly allows excess growth or large items caught in the matrix to be removed.

Preferably, the one or more modular units further comprise air injection means. One embodiment of the present invention features an air conduit which directs air from an air source or an air/fluid mixture from a venturi to a modular unit to distribute air and pollutants to the matrix supporting organisms.

Preferably, one or more modular units comprises buoyancy chambers. The buoyancy chambers may comprise buoyancy packing, expanded polystyrene plastic, STYROFOAM, or comprise closed cavities which contain air.

Preferably, one or more modular units comprise ballast chambers. The ballast chambers may be packed with sand, rock, or other dense material, or may be open to contain various amounts of fluid to provide different amounts of ballast.

A further embodiment of the present invention features a containment vessel having a plurality of layers. The plurality of layers comprise at least one first layer and at least one second layer. At least one layer has a inlet opening and at least one layer has an outlet opening. Each layer is in fluid communication with at least one other layer to define fluid movement between layers. The first layer and second layer are vertically oriented with respect to each other. Fluid movement between the first layer and second layer is vertical. The first and second layer define at least one chamber, which chamber receives fluid from an inlet opening in one layer and discharged through an outlet opening in the other layer to define a horizontal fluid flow within the chamber. The inner chamber has a matrix for immobilizing organisms and is in fluid communication with air injection means. Preferably, the uppermost layer has a wall with a light transmissive area for promoting growth of photosynthesis organisms.

A further embodiment of the present invention features a method of treating polluted fluids to biologically remove such pollutants. The method comprises the steps of creating a flow of air and polluted fluid into an inlet opening of a vessel having a top and a bottom and at least one wall. The wall defines a vessel exterior and an inner chamber and has at least one air impervious surface at the top of the vessel. The vessel further comprises an inlet opening and an outlet opening. The inner chamber is in fluid communication with the inlet opening to receive the flow of air and polluted fluid. The inner chamber is also in communication with the outlet opening to receive said fluid and air from said inner chamber to create a horizontal flow of air and fluid within the inner chamber. The inner chamber has a matrix for the attachment of organisms capable of degrading pollutants, which organisms take up the pollutants from the fluids flowing through the inner chamber and metabolize the pollutants in an aerobic process. The vessel has orientation means to maintain the vessel in a position in which the flow of fluid and air in the chamber is horizontal and air entering the inner chamber is prevented from escaping by the air impervious surface.

Preferably, the method uses a modular vessel. One embodiment of the present invention comprises the step of assembling a modular vessel.

These and other features will become apparent from the drawings and the detailed discussion which follow. This discussion will describe, by way of example, without limitation, preferred embodiments of the present invention.

DETAILED DESCRIPTION OF THE INVENTION

The present invention relates to methods and apparatus for treating polluted fluids. The apparatus and method feature a vessel for receiving microorganisms. The microorganisms are immobilized on solid surfaces within the vessel and provided with oxygen, a source of carbon and other nutrients. The carbon and other nutrients are derived from pollutants within the fluid. Under these conditions the microorganisms are incubated, developed and degrade the pollutants.

Figure 1:
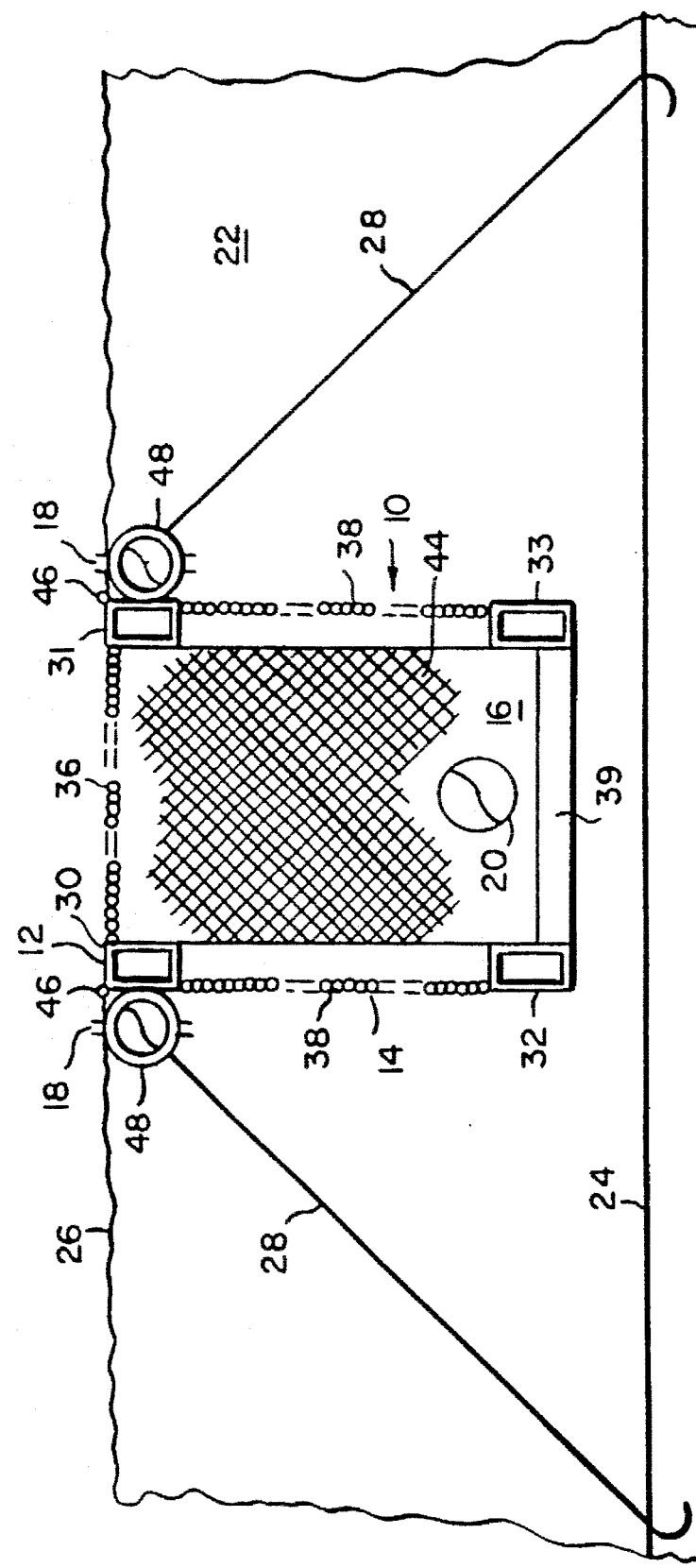
FIG. 1 depicts, in partial cutaway, an end view of an apparatus embodying features of the present invention.

FIG. 1 portrays an end view of one embodiment of the present invention. An apparatus generally designated by the numeral 10, comprises a frame 12 and wall panels 35 and 38 defining a chamber 14; a buoyancy device 18 associated with the frame; and an air/fluid inlet 20. The entire apparatus 10 sits in a body of fluid 22 to be cleaned, the body of fluid having a bottom 24 and a top surface level 26. The apparatus 10 further can include a guy or mooring 28 for affixing or tethering the apparatus 10 to a solid support such as, for example, the bottom 24 of the fluid, or a fixed object such as the ground, piling, pier or a boat.

The frame 12 may have any shape, however, manufacturing the apparatus with flat walls and beams may favor rectangular shapes. Turning now to FIG. 1, the frame 12 comprises a plurality of beams, including a pair of upper beams 30 and 31 and a pair of lower beams 32 and 33 extending the length of the apparatus. Transverse beams 34 and 39 interconnect the various upper and lower beams.

The materials used for the construction of the frames may be organic or inorganic materials such as metals, composite materials, fiberglass, glass, plastics, and laminates. In a preferred embodiment of the invention, beams 30, 31, 32, and 33 are fabricated of hot rolled steel. The dimensions of frame 12 will be adjusted by individuals skilled in the art based on the amount of the fluid to be treated and the degree of purity desired. The upper and lower beams 30, 31, 32 and 33 are preferably 6 inches by 12 inches and extend the length of the vessel. The length of the beams 30, 31, 32 and 33 are up to tens of meters. The transverse beams 34 are preferably 4 inches by 6 inches and extend the width or height of the vessel.

A preferred apparatus is 15 meters long by 2 meters wide by 2 meters deep. However, the apparatus may be made smaller or larger depending on the requirements of the site.

Figure 2:
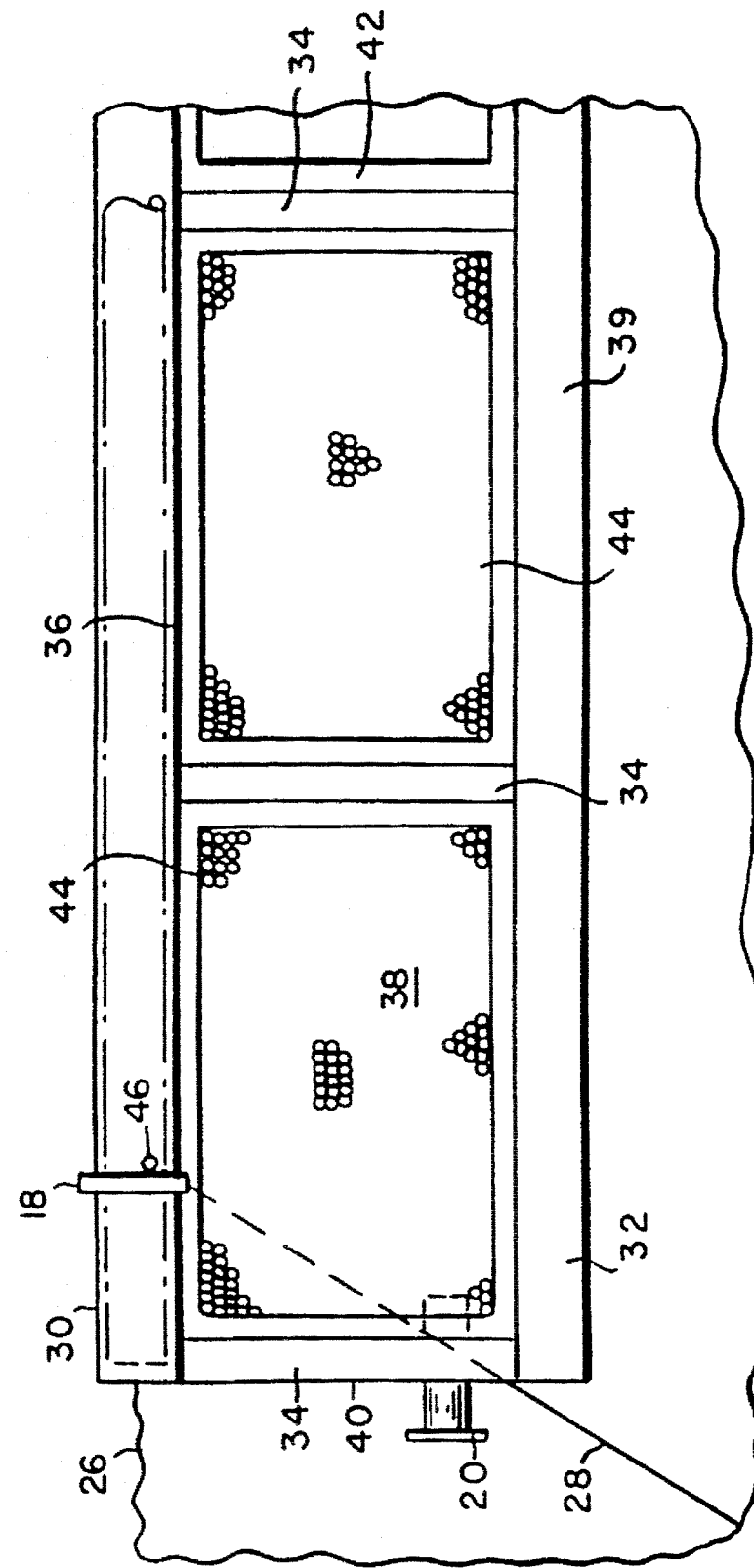
FIG. 2, depicts, in partial cutaway, a side view of an apparatus embodying features of the present invention.

Apparatus 10 has wall panels, exemplified by panels 36 and 38, secured to frame 12, as best seen in FIG. 2. Wall panels 36 and 38 are secured to the bottom (not shown), top and sides of frame 12 to define an inner chamber 14 having Two opposed ends 40 and 42.

One embodiment of the present invention features end panels (not shown) having one or more openings for receiving and discharging fluid. Most preferably, however, the opposed ends are not closed but are open to fluid flow. End 40 defines an inlet opening and end 42 defines an outlet opening. Thus, fluid to be cleaned can freely flow from end To end through the chamber.

Preferably, at least one of the wall panels 36 is made of a light-transmissive material such as glass or plexiglass to provide for introduction of light into the chamber.

Chamber 14 has a matrix 44. The matrix may comprise raschig rings or a honeycomb or mesh. Microorganisms are able to metabolize pollutants and form a dense colony immobilized on the matrix. The matrix serves as a stimulator of microorganism growth.

Preferably, the matrix comprises a biologically inert substance that will not adversely affect growth of the microorganism or adversely react to the polluted fluid. Polymers such as polyethylenes (e.g., polytetrafluoroethylene) or polyamides (e.g., nylons) are suitable. Nonpolymeric material such as stainless steel can also be used.

The matrix can be of any configuration. Preferred configurations will enhance the growth of the microorganism present in the chamber and will not impede necessary fluid flow. Preferred configurations include, but are not limited to, mesh-like netting, a plurality of spherical pellets, and the like.

Apparatus 10 comprises buoyancy chambers 48, attached to beams 30 and 31. Buoyancy chambers 48 comprise hollow cylinders with closed ends to define an air filled cavity 56. The cavity 56 may receive water or other dense material to regulate the depth of the apparatus 10. In the alternative to air, the cavity may be filled with polystyrene or other floatation means.

In the alternative, other buoyancy means may comprise polystyrene floats, the depth of the chamber being regulated by the volume of polystyrene.

One or more pumps [not shown] are associated with the buoyancy devices to alter the fluid level therein, thus regulating the depth of the apparatus 10.

Apparatus 10 has anchor lines 28 for placement in the bottom surface 24 of the body of fluid in which it is placed. Anchor lines 28 may comprise chains, cables, ropes lines and suitable anchor means such as hooks, tethers and the like. Preferably, the apparatus 10 is illustrated as floating in FIGS. 1 and 2, that is, having the upper sections 30 and 31 above fluid. Anchor lines 28 are attached to the inlet end 40 of apparatus 10 to allow the apparatus to swing with currents to flow fluid from the inlet end 40 to the outlet end In some circumstances, it may be advantageous to place the apparatus 10 on the bottom surface 24 of the body of fluid in which it is placed. In these situations, buoyancy means are not necessary. In situations where the fluid level in the body of fluid in which apparatus 10 is placed does not fluctuate, apparatus 10 can be positioned on legs [not shown].

A pipe 20 is positioned at the inlet opening end 40 of apparatus 10. Pipe 20 receives air and/or oxygen from a pump [not shown] or a mixture of air and/or oxygen with fluid from a venturi or other aeration device. Preferably, pipe 20 is in fluid communication with a venturi [not shown]. The venturi combines air and fluid from the body of fluid in which apparatus 10 is placed, and directs such fluid and air mixture into the inlet opening end 40. The fluid and air mixture travels horizontally the length of the apparatus 10 through the matrix within the chamber 44. The horizontal movement prevents the air or oxygen from immediately bubbling to the surface and allows organisms immobilized on the matrix of chamber 44 to utilize the pollutants and oxygen in metabolic processes. The horizontal movement results in extended residence time of the air and oxygen in the matrix.

Pumps [not shown] may be supported on the apparatus or located distal from the apparatus and connected in fluid communication with pipe 20 by means of hoses or conduits [not shown]. Pipe 20 may receive polluted fluid without air or oxygen where such polluted fluid has a sufficient dissolved oxygen to support metabolic growth of organisms.

Where fluid is provided by pipe 20 without air or oxygen, air can be passed through an airstone, sparger, or air passages and conduits to form bubbles within chamber 44. An exemplary method of forming bubbles is described in U.S. Pat. No. 4,215,082.

If additional fluid is desired, a fluid intake may be located at some distance remote from the fluid filled incubator such as, for example, the fluid intake configuration as shown in U.S. Pat. No. 4,350,589.

Oxygen or air can also be introduced into the fluid-filled incubator by means of direct exposure to the atmosphere. In cases where the fluid filled incubator is directly exposed to a suitable source of ambient air and/or oxygen, pumping of air and/or oxygen into the fluid may not be required. Fluids may be pumped to maintain an adequate flow of fluids through the chamber 44 in order to provide nutrition for the microorganism.

Other requirements for microbial growth such as, for example, nitrogen and phosphorous minerals, are provided the microorganism on the matrix by nutrients existing in the fluid medium, which may increase due to the introduction of added quantities of atmospheric air and/or oxygen. In the alternative, additional growth requirements may be introduced through pipe 20 or be obtained directly from nutrients incorporated into the matrix material.

Organisms are usually present in fluid bodies; however, in many instances, the organisms are not efficient in metabolizing pollutants due to low population density. The matrix of chamber 44 allows organisms to become immobilized and attain a high population density. A mature matrix may comprise 2–10 metric tons of biomass. Where organisms are not present which are acclimated to the pollutants, for example, in "spill" situations, a particular microorganism can be added to the matrix of chamber 44 at a seed culture.

In operation, a fluid/air mixture provided by a venturi is pumped into the vessel 10 through pipe 20. Microorganisms immobilized on the matrix biodegrade pollutants in the fluid. The apparatus 10 described herein is capable of processing influent with a biological oxygen demand (BOD) of approximately 250–410 mg/L, and a BOD load of 1,200 to 1,500 kg/day. The apparatus 10 is capable of removing as much as approximately 1,250 kg/day with an electrical consumption of approximately 860 kw/hour/day. Thus, the apparatus is capable of removing 90% of BOD from influent at an efficiency of approximately 1.4–1.5 kg BOD removed per 1.0 kw/hr.

Figure 3:
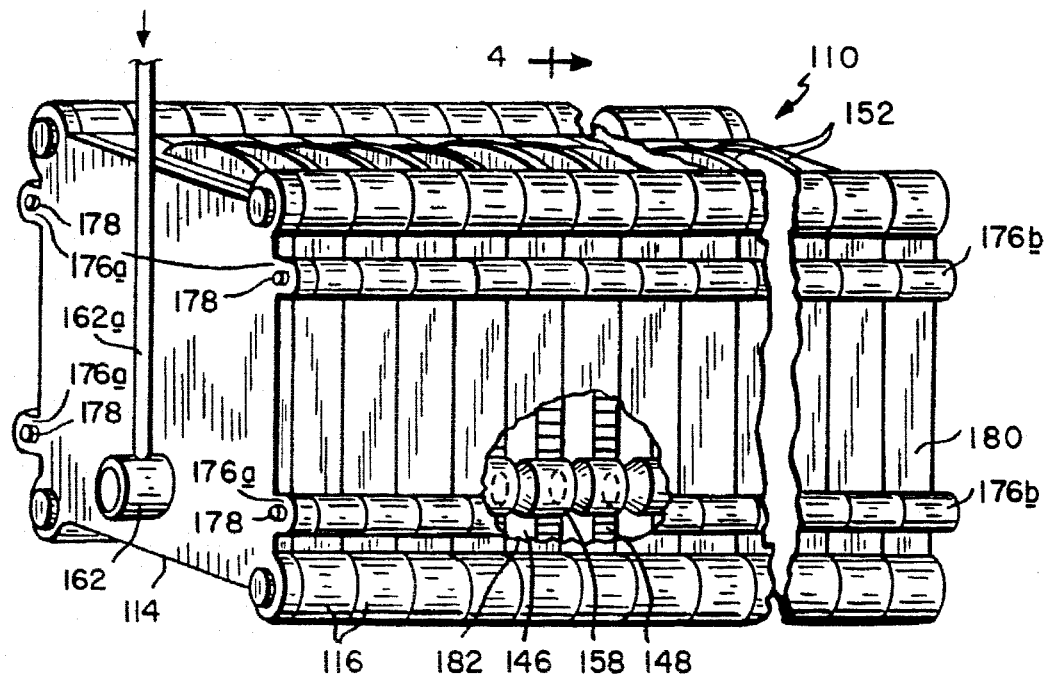
FIG. 3 depicts an apparatus embodying features of the present invention comprising modular units.

A further embodiment of the present invention is depicted in FIG. 3. This embodiment features an apparatus generally designated by the numeral 110, for treating the polluted fluids. Apparatus 110 comprises modular units including an end piece 114 and a plurality of segment pieces 116.

Figure 4:
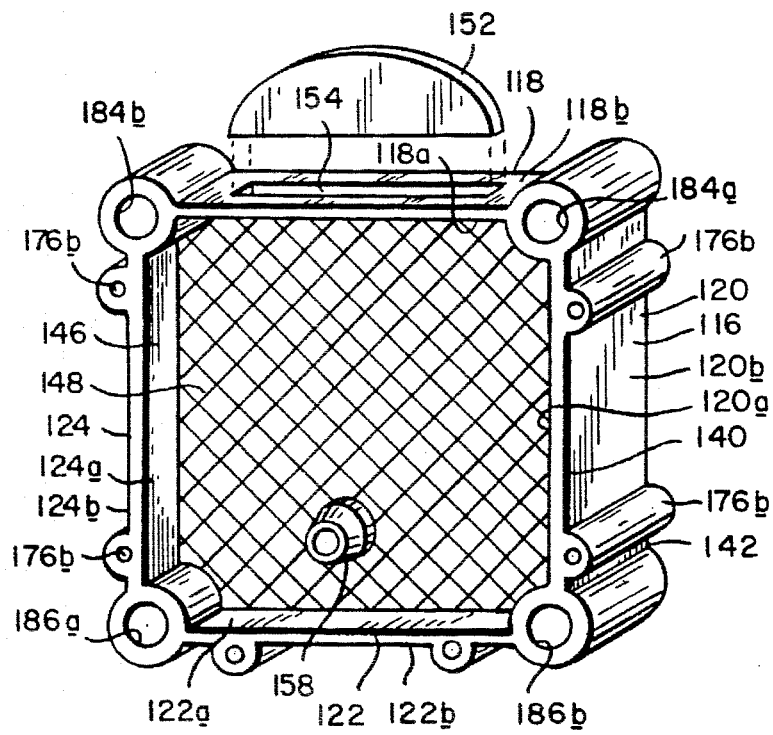
FIG. 4 depicts one modular unit embodying features of the present invention.

Turning now to FIG. 4, a segment piece 116 is illustrated in greater detail, apart from the overall apparatus 110. Segment piece 116 has walls 118,120,122, 124. Each wall 118, 120,122 and 124 has an inner surface 118a, 120a, 122a, and 124a and an exterior surface 118b, 120b, 122b, and 124b.

Figure 5:
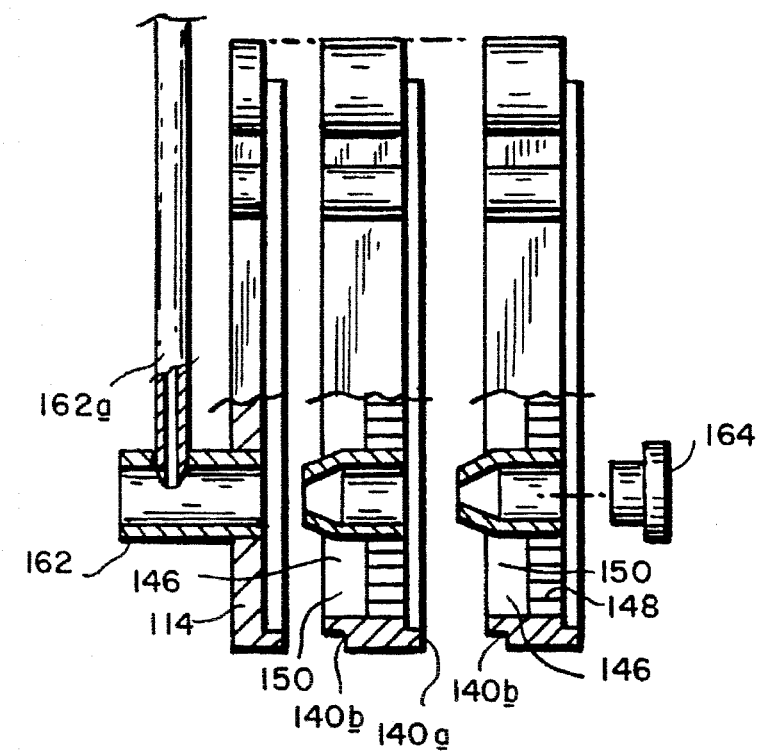
FIG. 5 depicts an end piece pipe and an air/fluid conduit embodying features of the present invention.

Each segment 116 has an inlet end 140 and an outlet end 142. The inlet end 140 and outlet end 142 have nesting edges comprising a flange 140a and rim 142b as best seen in FIG. 5. Nesting edges allow the rim 142b of inlet end 140 of one segment piece 116 to be received in alignment within flange 140a of the outlet end 142 of a second segment piece 116. Other nesting alignment surfaces, such as tongues and grooves, mating protrusions and cavities and the like may also be used. The nesting edges are sealed with suitable caulking, welding, gaskets seals and the like [not shown].

Figure 6:
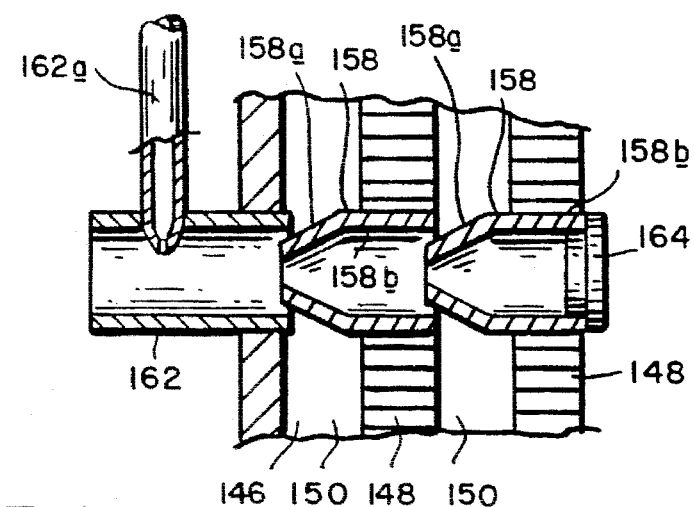
FIG. 6 depicts air/fluid conduits nesting of each modular unit in cooperation with an end piece pipe embodying features of the present invention.

Turning now to FIGS. 4 and 5, segment piece 116 has an inner chamber 146 defined by inner surfaces 118a, 120a, 122a and 124a. A section of the inner chamber 146 comprises a matrix 148 for immobilizing microorganisms and a hollow area 150 which is devoid of matrix 148, as best seen in FIG. 6. Matrix 148 is preferably integral with segment piece 116 to provide additional strength and to minimize assembly, but can be a separate component. Preferably, matrix 148 is honeycomb-like and open ended, to allow fluid to flow readily through the segment piece.

Hollow area 150 allows for fluid distribution through segment piece 116 and acts in cooperation with a light transmissive window 152, as best seen in FIG. 4. Light transmissive window 152 is received in an opening 154 of wall 118 of segment piece 116. Light transmissive window 152 allows light to enter hollow area 150 to promote the growth of photosynthetic organisms, such as algae, immobilized on the matrix 148. Light transmissive window 152 is preferably bubble-shaped to maintain transparent surfaces free of fluid. Light transmissive window 152 which is submerged in fluid may develop an occluding film of algal growth. Light transmissive window 152 is secured and sealed to the wall 118 by suitable means such as fluid impervious seals, gaskets, caulking and fasteners and may be replaced as necessary in the event such window no longer transmits light.

Opening 154 may be provided in each wall 118, 120, 122a and 124, and closed with light transmissive window 152 or opaque wall panels (not shown). Thus, modular unit 116 may act as a frame to which panels are attached.

As best seen in FIG. 4, segment piece 116 has an air/fluid conduit 158 for receiving air or fluid. And, referring now to FIGS. 5 and 6, end piece 114 has an end piece conduit 162 for receiving and directing such air and fluid into air/fluid conduit 158. Air/fluid conduit 158 has a forward conical section 158a and a rearward cylindrical section 158b. Forward conical section 158a cooperates with a end piece conduit 162 of end piece 114 or a rear section 158b of another segment piece 116. Forward conical section 158a is spaced from rear section 158b or end piece conduit 162 to form an opening. Thus, forward conical section 158a receives a portion of fluid or air flowing from end piece conduit 162 and directs a portion to the matrix 148 of the segment piece 116. In the alternative, air/fluid conduit 158 may be cylindrical, without conical sections 158a, and have gaps [not shown] to allow air/fluid to flow to the matrix 148, or in the alternative, have perforations or holes [not shown] to allow air/fluid to flow to the matrix of segment piece 116.

An end plug 164 prevents air/fluid mixture from proceeding out the air/fluid conduit without passing through a matrix. End plug 164 is illustrated at the last segment piece 116. However, it may be useful to place end plug 164 in an air/fluid conduit several segment pieces 116 from the end.

Turning now to FIGS. 3 and 5, in the event end piece conduit 162 is intended to receive air only, end piece 114 has additional openings for receiving polluted fluid or end piece 114 is an open matrix to allow fluid to enter. Indeed, end piece 114 can be omitted and air/fluid connected to air/fluid conduit 158 of the first segment piece 116 if desired. Preferably, end piece conduit 162 incorporates features of a venturi. An air tube 162a for drawing air is illustrated in FIG. 3 and 5. In the alternative, end piece conduit 162 is placed in communication with a venturi device for providing an air/polluted fluid mixture to air/fluid conduit 158.

Preferably end piece 114 has an edge surface 170 capable of being received in cooperation with edge surface 140 of segment piece 116. End piece 114 and segment piece 116 have cooperating bolt eyes 176a and 176b respectively. As seen in FIG. 3, bolt eyes 176a and 176b receive a rod 178 which has threaded ends (not shown) for receiving nuts (not shown) for securing a plurality of segment pieces 116 and an end piece 114 to form a vessel 180 having an inner chamber 182 comprising a plurality of segment chambers 146 and segment matrices 148.

Returning now to FIG. 4, each segment piece 116 has two buoyancy chambers 184a and b and two ballast chambers 186a and b. Buoyancy chambers 184a and b are preferably filled with expanded polyethylene (styrofoam) packing; however, such chambers may be airtight and filled with air. If buoyancy is not desired, additional ballast may be added or buoyancy chambers opened to the fluid in which it is placed.

Ballast chambers 186a and b are preferably packed with a dense material such as sand, rock, gravel and the like or, have openings (not shown) to allow void space to be occupied by fluid rather than air.

Buoyancy chambers 184a and b and ballast chambers 186a and b cooperate to maintain each segment piece 116 oriented with top wall 118 to a light source.

In operation, end piece conduit 162 is connected to a source of air/fluid mixture. The air/fluid mixture is pumped through pipe 162 and each air/fluid conduit 158 of segment piece 116, up to the last air/fluid conduit 158. The flow of the air/fluid mixture is blocked by end plug 164. The air/fluid mixture is distributed to each segment piece where it flows past one or more segment matrices 148.

Microorganisms on the segment matrices 148 receive the oxygen and pollutants and metabolize the pollutants. Fluid having less pollutants than when entering the apparatus 110 exits the last segment matrix 148.

Figure 7:
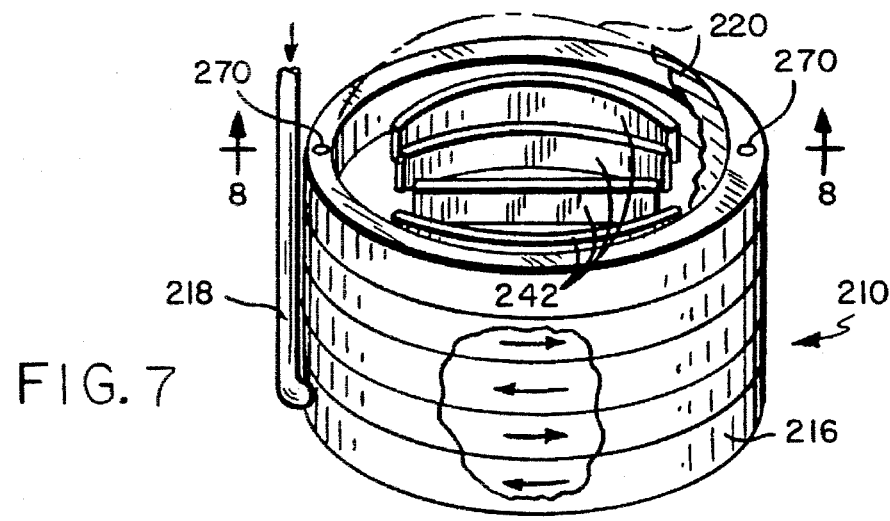
FIGS. 7 and 8 depict an apparatus embodying features of the present invention comprising modular units.
Figure 8:
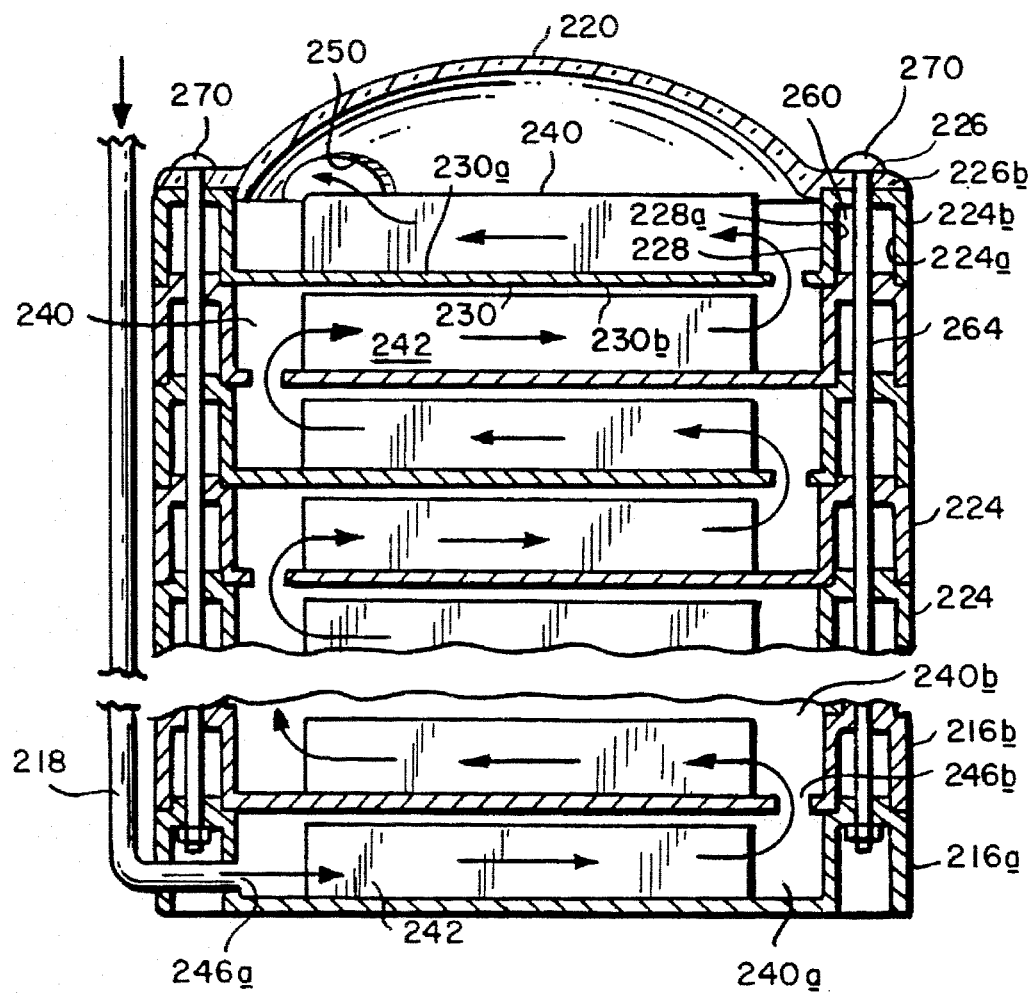

A further embodiment of the present invention is depicted in FIGS. 7 and 8. This embodiment features an apparatus, generally designated by the numeral 210, for treating polluted fluids. Apparatus 210 comprises a plurality of segment pieces 216, inlet conduit 218 and an end piece 220.

Segment piece 216 is illustrated as having an oval shape when viewed from the top; however, segment piece 216 may comprise any convenient shape. Rounded forms, such as elipsoids, circles, and ovals, may distribute stress throughout the form.

Turning now to FIG. 8, segment piece 216 has an outer wall 224, a top wall 226, a lateral wall 228 and a bottom wall 230. Outer wall 224 has an inside surface 224a and an exterior surface 224b. Similarly, top wall 226 has an inside surface 226a and an exterior surface 226b. Lateral wall 228 has an inside surface 228a and an exterior surface 228b Bottom wall 230 has a top surface 230a and a bottom surface 230b.

As illustrated in FIG. 8, the top surface 230a of bottom wall 230 inside surface 228a of lateral wall 228 of one segment piece 216a and the bottom surface 230b of segment piece 216b form a chamber 240.

At least one surface has projections which form a matrix through which fluids flow. As illustrated in FIG. 7, the top surface 230a of bottom wall 230 of segment piece 216a has a plurality of projections 242 which define a matrix when a bottom surface 230b of a segment piece 216 is placed above. In the alternative a bottom surface 230b may have projections (not shown) which cooperate with the top surface 230a of a bottom wall of a separate segment piece 216. The projections 242 of one surface may be received within cavities (not shown) of projections of a cooperating adjacent segment piece 216 to facilitate assembly and to add rigidity to the structure.

Air/fluid conduit 218 is in fluid communication with a source of an air/fluid mixture (not shown) and an air/fluid inlet aperture 246a in bottom segment piece 216.

Air/fluid inlet opening 246a is in fluid communication with chamber 240a. Segment piece second from the bottom 216b has an opening 246b positioned opposite the air/fluid inlet opening 246a of segment piece 216a, in chamber 240a. Opening 246b is an outlet for chamber 240 and an inlet for a second chamber 240b formed with segment piece 216b and the next segment piece.

End piece 220 is preferably transparent to allow light into top chamber 240c. End piece 220 has an exit opening 250 positioned opposite the opening 246 of top segment piece 216. Thus, fluids flowing through each chamber 240 have a substantially horizontal flow. This horizontal flow is repeated in each segment piece 216 as illustrated in FIG. 8.

Inside surface 224a of outer wall 224, inside surface 226a of top wall 226, and exterior wall 228b of lateral form a buoyancy/ballast chamber 260. Buoyancy/ballast chamber 260b of top segment piece 216 is filled with a buoyancy material such as air or expanded polystyrene, STYROFOAM. Buoyancy/ballast chambers 260 to the bottom of apparatus 210 are filled with a dense material such as sand, gravel or drilled open to be filled with water.

Preferably, segment pieces 216 nest with each other through interlocking grooves, and indentations (not shown) on exterior surface 226b of top wall 226 and outer wall 224 and lateral wall 228. In the alternative, top surface 226b of top wall 226 and exterior surface 224a of outer wall 224 and exterior surface 228b of lateral wall 228 may nest within buoyancy cavity 260.

As illustrated in FIGS. 7 and 8, segment pieces 216 and end pieces 220 are fastened by suitable means such as rods 264 extending through cooperating holes 270. Rods 264 are preferably threaded to receive nuts (not shown).

In operation, an air/fluid mixture including polluted fluid is pumped through air/fluid conduit 218. The air/fluid mixture is received through opening 246a of segment piece 216a. The air/fluid mixture traverses horizontally through chamber 240a and the matrix of projections 242. Organisms immobilized on the matrix of projections 242 degrade and metabolize pollutants. The air/fluid mixture then enters a further opening 246 into a further chamber 240, traversing each chamber until exiting through exit opening 250. The unit is disassembled to remove debris.

The foregoing description is only illustrative of the principles of the invention. It is to be understood that the Invention is not limited to the exact construction as illustrated and described herein. Accordingly, all expedient modifications may be made within the spirit of the invention.

What is claimed is:

1. An apparatus for incubating and promoting growth and metabolism of organisms, which organisms utilize pollutants in a body of fluid for metabolic processing comprising:

at least one containment vessel having a top and a bottom and one or more walls defining a vessel exterior and an inner chamber, said vessel having an inlet opening and an outlet opening, said inlet opening adapted to receive fluid and direct such fluids into the interior chamber, said outlet opening adapted to receive fluid from the interior chamber and directing said fluid to the vessel exterior, said inlet opening and outlet opening establishing a flow of fluid within said inner chamber which flow is horizontal, said inner chamber further comprising a matrix, said matrix having receiving surfaces for immobilizing organisms within said inner chamber within the flow of fluid, said wall having at least one air impervious surface at the top of the vessel above the matrix to maintain air in the vessel as fluid moves through the matrix;

an oxygen injection means for directing oxygen into said inner chamber to support the growth and metabolism of organisms within said inner chamber;

orientation means for maintaining said vessel in a position where said flow of fluid is horizontal and said air impervious surface above the matrix; and, said containment vessel, oxygen injection means and orientation means are comprised of a plurality of modular units, each unit comprising a section of said interior chamber and matrix, a section of said oxygen injection means, and a section of said orientation means said modular unit having a first surface and a second surface, said first surface of one modular unit interfitting with a second surface of a second modular unit.

2. The apparatus of claim 1 further comprising fluid movement means for directing fluid into said inlet opening.

3. The apparatus of claim 1 wherein said wall comprises at least one light transmissive area for receiving and directing light into said inner chamber.

4. The apparatus of claim 3 wherein said orientation means maintains the orientation of said light transmissive area towards a source of light.

5. The apparatus of claim 1 wherein said orientation means comprise buoyancy chambers secured to the vessel to provide said top of said vessel with positive buoyancy, with respect to said bottom, to orient said containment vessel with said top surface above said bottom.

6. The apparatus of claim 5 wherein said buoyancy chamber comprises buoyancy adjustment means for changing the positive buoyancy of said chamber allowing said containment vessel to float at different depths of fluid.

7. The apparatus of claim 1 wherein each modular unit comprises a frame, said frame for supporting said one or more walls and said containment vessel comprising one or more walls secured to said frame.

8. The apparatus of claim 7 wherein said modular unit comprises at least one wall.

9. The apparatus of claim 1 wherein said orientation means comprises at least one buoyancy chamber, said buoyancy chamber containing a material which has positive buoyancy.

10. The apparatus of claim 9 wherein said buoyancy chamber has a packing of expanded polystyrene plastic.

11. The apparatus of claim 9 wherein said buoyancy chamber is closed and contains air.

12. The apparatus of claim 1 wherein orientation means comprises legs for supporting said vessel on the fluid bed of a body of fluid.

13. The apparatus of claim 1 wherein said unit is molded.

14. The apparatus of claim 1 wherein said unit disassembles to allow removal of debris.

15. The apparatus of claim 1 wherein said inner chamber contains microorganisms capable of biodegrading said pollutants.

16. The apparatus of claim 1 wherein said section of oxygen injection means of said modular unit comprises an air/fluid conduit for receiving air or fluid, said conduit receiving a portion of the fluid or air flowing and directing such portion into a matrix of a modular unit and a portion into a air/fluid conduit of a further modular unit.

17. The apparatus of claim 16 wherein said air/fluid conduit has a forward section and a rearward section, said forward section of one modular unit having a conical shape and said rearward section of a second modular unit defining a gap to allow said portion of said air/fluid to flow to the matrix and a portion to be received by said conical section.

18. An apparatus for incubating and promoting growth and metabolism of organisms, which organisms utilize pollutants in a body of fluid for metabolic processes comprising:

at least one containment vessel having a top and a bottom and one or more walls defining a vessel exterior and an inner chamber, said vessel having an inlet opening and an outlet opening, said inlet opening adapted to receive fluid and direct such fluids into the interior chamber, said outlet opening adapted to receive fluid from the interior chamber and directing said fluid to the vessel exterior, said inlet opening and outlet opening establishing a flow of fluid within said inner chamber which flow is horizontal, said inner chamber further comprising a matrix, said matrix having receiving surfaces for immobilizing organisms within said inner chamber within the flow of fluid, said wall having at least one air impervious surface at the top of the vessel above the matrix to maintain air in the vessel as fluid moves through the matrix an oxygen injection means for directing oxygen into said inner chamber to support the growth and metabolism of organisms within said inner chamber orientation means for maintaining said vessel in a position where said flow of fluid is horizontal and said air impervious surface above the matrix wherein said containment vessel has a plurality of layers, comprising at least one first layer and one second layer, at least one layer having said inlet opening and at least one layer having said outlet opening, each said layer defining an inner chamber in fluid communication with at least one other inner chamber to define upward fluid movement between said inner chambers, and a horizontal fluid movement within said inner chambers; and said containment vessel is comprised of a plurality of modular units, each unit comprising a top surface and a bottom surface wherein said top surface of one modular unit and the bottom surface of adjacent modular unit interfit to form a layer, each modular unit having a section of said oxygen injection means and a section of said orientation means.

19. The apparatus of claim 18 comprising a modular unit having a top surface and a bottom surface, said top surface of one unit receiving a bottom surface of another unit to form said inner chamber.

20. The apparatus of claim 18 wherein at least one surface of said top and bottom surfaces of said unit has projections forming a matrix.

21. A method of treating polluted fluids to biologically remove pollutants comprising the step of:

creating a horizontal flow of oxygen and polluted fluid into an inlet opening of a vessel, said vessel having a top and a bottom, an inlet opening and an outlet opening, and at least one wall defining said vessel exterior and an inner chamber, said inner chamber having an oxygen injection means in communication with said inlet opening to receive said flow of oxygen and polluted fluid and said outlet opening in communication with said inner chamber to receive said fluid and air from said inner chamber to create a horizontal flow of oxygen and polluted fluid within said inner chamber, said inner chamber having a matrix for immobilizing microorganisms capable of degrading pollutants, said wall having at least one air impervious surface at the top of the vessel above the matrix, said vessel having orientation means for maintaining the vessel in a position where said flow of fluid is horizontal and said air impervious surface above the matrix; and said containment vessel, oxygen injection means and orientation means are comprised of a plurality of modular units, each unit comprising a section of said interior chamber and matrix, a section of said oxygen injection means, and a section of said orientation means, said modular unit having a first surface and a second surface, said first surface of one modular unit interfitting with a second surface of a second modular unit; said microorganisms absorbing pollutants from said fluids flowing through said inner chamber and metabolizing said pollutants to remove pollutants from the fluid.

22. The method of claim 21 further comprising the step of orienting the vessel to receive pollutants.

23. The method of claim 22 wherein said step of orienting the vessel is performed by adding or subtracting buoyancy materials within buoyancy chambers affixed to said vessel, said buoyancy chambers capable of maintaining said vessel at a predetermined depth to receive polluted fluids.

* * * * *